United States Patent Office 3,405,162
Patented Oct. 8, 1968

3,405,162
COPOLYMER PRODUCED BY THE COPOLYMERIZATION OF AN ORGANIC STARTER, A VICINAL EPOXIDE, AND AN ETHYLENICALLY UNSATURATED MONOMER
William Collier Kuryla, St. Albans, W. Va., assignor to Union Carbide Corporation, a corporation of New York
No Drawing. Filed Oct. 23, 1964, Ser. No. 406,182
14 Claims. (Cl. 260—465.6)

---

ABSTRACT OF THE DISCLOSURE

Copolymer polyols are produced by the simultaneous reaction of an organic starter with a mixture of a vicinal epoxide and a polymerizable ethylenically unsaturated monomer. The copolymer polyols are random copolymers having in the molecule polymerized divalent alkyleneoxy residues from the vicinal epoxide and polymerized polyvalent residues from the polymerizable ethylenically unsaturated monomer; these polymerized residues are attached to the residue of the particular organic starter used. The copolymer polyols can be used to produce urethane polymers.

---

This invention relates to novel copolymer polyol compositions and to polyurethane compositions produced therefrom.

In the instant invention, copolymer polyols not heretofore known are produced by the inter-reaction of an organic starter or initiator, a vicinal epoxide, and a polymerizable ethylenically unsaturated monomer. These copolymer polyols, therefore, contain the residue of the organic starter, the divalent residue of the vicinal epoxide, and the divalent residue of the polymerizable ethylenically unsaturated monomer in the molecule and the molecule has a plurality of, i.e. two or more, hydroxyl groups. The presence of reactive hydrogen atoms makes the copolymer polyols of interest in the production of polyurethane compositions and they have been used to produce polyurethanes.

The copolymer polyol compositions are produced by the catalytic copolymerization of the vicinal epoxide and the polymerizable ethyleneically unsaturated monomer with the organic starter. The amounts of vicinal epoxide and ethylenically unsaturated monomer reacted will vary depending upon the copolymer polyol that is to be produced and the number of reactive hydrogen atoms in the organic starter. Also, the mole ratio of vicinal epoxide to ethylenically unsaturated monomer can be varied broadly depending upon whether one desires a copolymer polyol having a high alkylenoxy content or a copolymer polyol having a high alkylenyl content as these terms are hereinafter defined. The copolymer polyols can contain up to about 50 weight percent of ethylenically unsaturated monomer copolymerized therein; preferably however the amount is from about 5 to 25 weight percent.

The organic starters or initiators are those compounds having at least one reactive hydrogen atom capable of reacting with a vicinal epoxide compound. Compounds that are suitable for use as starters include monofunctional compounds such as alcohols, mercaptans, amines, and monocarboxylic acids, and polyfunctional compounds such as polyols, polyamines, amino alcohols, polyhydric polymers, amides, sulfonamides, hydrazones, semicarbazones, oximes, polycarboxylic acids, hydroxycarboxylic acids, aminocarboxylic acids, etc. These organic starters are portrayed by the general formula $RH_x$ wherein H represents the reactive hydrogen atom attached to the residue R of the organic starter and $x$ is an integer.

Alcohols falling within the class of $RH_x$ compounds that are useful as monofunctional organic starters include those organic compounds which contain an alcoholic hydroxyl group (—OH), for instance, monohydric alcohols such as methanol, ethanol, propanol, isopropanol, 1-butanol, allyl alcohol, 2-butanol, tert-butanol, 3-butenol, 1-pentanol, 3-pentanol, 1-hexanol, hex-5-en-1-ol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, lauryl alcohol, benzyl alcohol, phenyl methyl carbinol, cyclohexanol, cyclopentanol, cycloheptanol, and trimethylcyclohexanol. Further alcohols contemplated include the monoesterified diols such as those prepared by the reaction of equimolar amounts of an organic monocarboxylic acid, ester, or acyl halide, with a diol such as the alkylene glycols, poly(alkylene glycols), mono- and polyether diols, mono- and polyester diols, etc., e.g.,

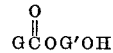

wherein

is acyl and G' is a divalent organic radical containing at least two carbon atoms in the divalent chain; the monoetherified diols such as those represented by the formula G″OG′OH wherein G″ represents a hydrocarbyl or oxahydrocarbyl radical and G' has the aforesaid value; the mono-ols produced by the partial esterification reaction of a polyol containing at least three hydroxyl groups, e.g., glycerine, with a molar deficiency of an organic carboxylic acid, ester, or acyl halide; and the like. The aforesaid reactions are well documented in the literature.

Illustrative amines within the group of $RH_x$ compounds that are useful as monofunctional organic starters include primary and secondary amines, e.g., organic amines which contain the —NH₂ group or the —NG‴H group, G‴ being hydrocarbyl, i.e. a radical containing hydrogen and carbon atoms only, such as alkyl, aryl, cycloalkyl, alkaryl, aralkyl, etc., as illustrated by the methyl-, ethyl-, n-propyl-, isopropyl-, n-butyl-, sec-butyl-, isobutyl-, tert-butyl-, n-amyl-, n-hexyl-, and 2-ethylhexylamines, as well as the corresponding dialkylamines; the aromatic amines such as aniline, ortho-toluidine, metatoluidine, and the like; the cycloaliphatic amines such as cyclo-hexylamine, dicyclohexylamine, and the like; and heterocyclic amines such as pyrrolidine, piperidine, morpholine, and the like.

Illustrative of the monocarboxylic acids included in the class of $RH_x$ compounds are those organic compounds which contain a sole carboxyl group (—COOH) as exemplified by the alkanoic acids, the cycloalkanecarboxylic acids, the monoesterified dicarboxylic acids, e.g.,

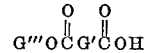

wherein G‴ is hydrocarbyl and G' is the divalent residue of a dicarboxylic acid minus the two dicarboxylic groups, etc. Specific examples include propionic acid, butyric acid, valeric acid, dodecanoic acid, acrylic acid, cyclohexanecarboxylic acid, the mono-2-ethylhexyl ester of adipic acid, and the like.

Among the $RH_x$ organic starters are the polyols which contain at least two alcoholic hydroxyl groups such as the diols of the formula HO—G″″—OH wherein G″″ is a substituted or unsubstituted alkylene radical or a substituted or unsubstituted (alkyleneoxy)$_n$alkylene radical and wherein $n$ is at least one. Of course, G″″ has at least two carbon atoms in the alkylene chain, and the substituents or pendant groups on said G″″ can be lower alkyl, halo, lower alkoxy, etc., such as methyl, ethyl, n-propyl, isopropyl, chloro, methoxy, ethoxy, and the like. Illustrative diols include ethylene glycol; propylene glycol; butylene glycol; diethylene glycol; dipropylene glycol; 2,2-dimethyl-1,3-propanediol; 2-butene-1,4-diol; 2,2-diethyl-1,3-propanediol; 3-methyl-1,5-pentanediol; the N-methyl- and N-ethyldiethanolamines; the various cyclohexanediols; 4,4'-methylenebiscyclohexanol; 4,4- isopropylidenebiscyclohexanol; the ortho-, meta-, and para-xylylene glycols; the hydroxymethyl substituted phenethyl alcohols; the ortho-, meta-, and para-hydroxymethyl phenylpropanols; the various phenylenediethanols; the various phenylenedipropanols; the various heterocyclic diols such as 1,4-piperazinediethanol; and the like. Polyester polyols prepared by the reaction of a dicarboxylic acid, its diester, or dihalide with a molar excess of a diol are likewise suitable, e.g., the reaction of one mole of adipic acid with 2 mols of ethylene glycol.

Other suitable hydroxyl-containing organic starters include the low molecular weight polyoxyalkylated derivatives of mono- and polyfunctional compounds having at least one reactive hydrogen atom. These functional compounds may contain primary or secondary hydroxyls, phenolic hydroxyls, primary or secondary amino groups, amido, hydrazino, guanido, ureido, mercapto, sulfino, sulfonamide, or carboxyl groups. They are obtained by reacting, for example, (1) monohydric compounds such as aliphatic and cycloaliphatic alcohols, e.g., alkanol, alkenol, methanol, ethanol, allyl alcohol, 3-buten-1-ol, 2-ethylhexanol, etc.; diols such as ethylene glycol, propylene glycol, diethylene glycol, butylene glycol, propylene glycol, dipropylene glycol, tetraethylene glycol, and the like; thiodiethanol, the xylenediols, 4,4'-methylenediphenol, 4,4'-isopropylidenediphenol, resorcinol; and the like; the mercapto alcohols such as mercaptoethanol; the dibasic acids such as maleic, succinic, glutaric, adipic, pimelic, sebacic, phthalic, tetrahydrophthalic, and hexahydrophthalic acids; phosphorous acid; the aliphatic, aromatic, and cycloaliphatic primary monoamines, like methylamine, ethylamine, propylamide, butylamine, aniline, and cyclohexylamine; the secondary diamines like N,N'-dimethylethylenediamine; and the amino alcohols containing a secondary amino group such as N-methylethanolamine; with (2) the vicinal monoepoxides as exemplified by ethylene oxide, 1,2-epoxypropane, 1,2-epoxybutane, 2,3-epoxybutane, isobutylene oxide, butadiene monoxide, allyl glycidyl ether, 1,2-epoxyoctene-7, styrene oxide, and mixtures thereof. The preparation of the such polyoxyalkylated derivatives is illustrated by the reaction of 1,4-butanediol with ethylene oxide;

H(OCH₂CH₂)ₓO(CH₂)₄O(CH₂CH₂O)ᵧH wherein x and y are integers.

Also suitable as polyols are the polyoxyalkylated derivatives of polyfunctional compounds having three or more reactive hydrogen atoms as, for example, the reaction product of 1,1,1-trimethylolpropane with ethylene oxide in accordance with the reaction:

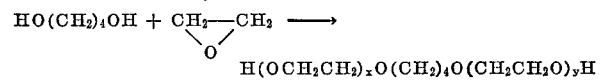

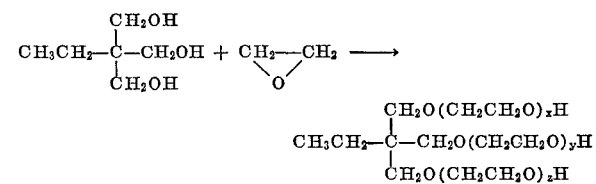

wherein x, y and z are integers.

In addition to the polyoxyalkylated derivatives of trimethylolpropane set forth above, the following illustrative compounds and their oxyalkylated derivatives are likewise suitable: glycerol; 1,2,4-butanetriol; 1,2,6-hexanetriol; erythritol; pentaerythritol; sorbitol; the methyl glycosides; glucose, sucrose; the diamines of the general formula $H_2N(CH_2)_nNH_2$, where $n$ equals 2 to 12; 2-(methylamino)ethylamine; the various phenylene- and toluenediamines; benzidine; 3,3'-dimethyl-4,4'-biphenyldiamine; 4,4'-methylenedianiline; 4,4',4''-methylidynetrianiline, the cycloaliphatic diamines such as 2,4-cyclohexanediamine, 1-methyl-2,4-cyclohexanediamine, and the like; the amino alcohols of the general formula $HO(CH_2)_nNH_2$, where $n$ equals 2 to 10; the polyalkylene polyamines such as diethylenetriamine, triethylenetetramine, tetraethylenepentamine, and the like; the polycarboxylic acids such as citric acid, aconitic acid, mellitic acid, pyromellitic acid, and the like.

Difunctional amino alcohols in the class $RH_x$ suitable for use as organic starters include, for example, the alcohols of the general formula $HO(CH_2)_nNH_2$, where $n$ equals 2 to 10; other hydroxyalkylamines such as N-methylethanolamine, isopropanolamine, N-methylisopropanolamine, and the like; the aromatic amino alcohols like para-amino-phenethyl alcohol, para-amino-alpha-methylbenzyl alcohol, and the like; the various cycloaliphatic amino alcohols such as 4-aminocyclohexanol, and the like.

Higher functional amino alcohols having a total of at least three hydroxy and primary or secondary amino groups that are suitable include the dihydroxyalkylamines, e.g., diethanolamine, diisopropanolamine, and the like; 2-(2-aminoethylamino)-ethanol; 2-amino-2-(hydroxymethyl)-1,3-propanediol; and the like.

Suitable diamines include aliphatic diamines of the general formula $H_2N(CH_2)_nNH_2$, monosecondary diamines of the general formula $R''NH(CH_2)_nNH_2$, and disecondary diamines of the general formula $$R''NH(CH_2)_nNHR''$$

where $n$ equals 2 to 10, and more, and where $R''$ is alkyl, aryl, aralkyl, alkaryl, or cycloalkyl; the aromatic diamines such as meta-phenylenediamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3'-dimethyl-4,4'-biphenyldiamine, 3,3'-dimethoxy-4,4'-biphenyldiamine, 3,3'-dichloro-4,4'-biphenyldiamine, 4,4'-methylenedianiline, 4,4'-ethylenedianiline, 2,3,5,6-tetramethyl-para-phenylenediamine, 2,5-fluoroenediamine, and 2,7-fluoroenediamine; the cycloaliphatic diamines such as 1,4-cyclohexanediamine, 4,4'-methylenebiscyclohexylamine, and 4,4'-isopropylidenebiscyclohexylamine; and the heterocyclic amines such as piperazine, 2,5-dimethylpiperazine, 1,4-bis(3-aminopropyl)piperazine, and the like.

Illustrative of the higher functional polyamines which can be employed as organic starters of the formula $RH_x$ one can include, for example, higher polyalkylene polyamines such as diethylenetriamine, triethylenetetramine, tetraethylenepentamine, dipropylenetriamine, tripropylenetetramine, tetrapropylenepentamine, and the like; 1,2,5-benzenetriamine, toluene-2,4,6-triamine; 4,4',4''-methylidynetrianiline, and the like; the polyamines obtained by interaction of aromatic monoamines with formaldehyde or other aldehydes, for example:

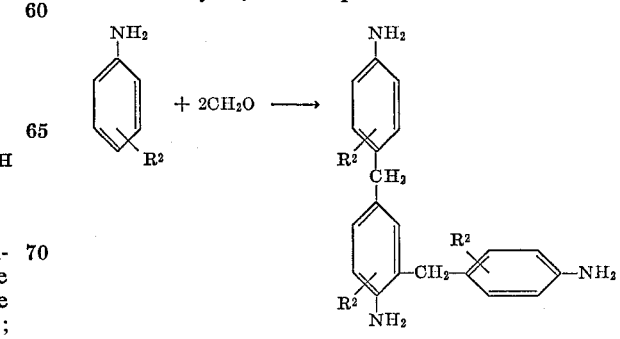

and other reaction products of the above general type, where $R^2$ is H or alkyl.

The organic starters $RH_x$ also include the vinyl polymers containing reactive hydrogen atoms in side groups along the polymer molecule, particularly the reactive hydrogen atoms in hydroxyl and primary and secondary amino groups. Such vinyl polymers may, for example, be obtained by copolymerization of ethylene and vinyl acetate followed by subsequent saponification of the acetate groups to yield polymers containing the group represented by the following formula:

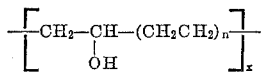

Other vinyl polymers that are suitable include polyvinyl alcohol, copolymers obtainable by copolymerization of a vinyl monomer such as ethylene with other vinyl monomers containing primary or secondary hydroxyl or amino groups or other groups containing reactive hydrogen atoms. Among the vinyl monomers from which such copolymers may, for example, be obtained are: ortho-, meta-, para-aminostyrene, 3-butene-1,2-diol, allyl alcohol, methallyl alcohol, 3-phenyl-3-butene-1-ol, and vinyl ethers like diethylene glycol monovinyl ether $$CH_2=CH—OCH_2CH_2OCH_2CH_2OH$$

Representatives of the many polycarboxylic acids that are suitable as polyfunctional organic starters are the aliphatic, cycloaliphatic, and aromatic dicarboxylic acids, such as oxalic acid, succinic acid, maleic acid, glutaric acid, adipic acid, pimelic acid, suberic acid, azelaic acid, sebacic acid, 4,4'-oxydibutyric acid, 5,5'-oxydivaleric acid, 6,6'-oxydihexanoic acid, 4,4'-thiodibutyric acid, 5,5'-thiodivaleric acid, 6,6'-thiodihexanoic acid, itaconic acid, phthalic acid, isophthalic acid, terephthalic acid, 1,5-naphthoic acid, 2,7-naphthoic acid, 2,6-naphthoic acid, 3,3'-methylenedibenzoic acid, 4,4'-(ethylenedioxy)dibenzoic acid, 4,4'-biphenyldicarboxylic acid, 4,4'-sulfonyldibenzoic acid, 4,4'-oxydibenzoic acid, the various tetrahydrophthalic acids, the various hexahydrophthalic acids, as well as higher functional acids such as tricarballylic acid, aconitic acid, citric acid, hemi-mellitic acid, trimellitic acid, trimesic acid, pyromellitic acid, 1,2,3,4-butanetetracarboxylic acid, and the like. Polycarboxy polyesters produced by the reaction of a sufficient molar excess of a polycarboxylic acid, e.g., adipic acid, with a polyol, e.g., diethylene glycol, are also suitable.

Suitable hydroxy- and aminocarboxylic acids, include 2-hydroxypropionic acid, 6-hydroxycaproic acid, 11-hydroxyundecanoic acid, salicyclic acid, para-hydroxybenzoic acid, beta-alanine 6-aminocaproic acid, 7-aminoheptanoic acid, 11-aminoundecanoic acid, and para-aminobenzoic acid.

In brief, therefore, the compounds which are extremely useful as organic starters in the polymerization reaction included the mono- and polycarboxy-containing $RH_x$ compounds, the mono- and polyhydroxy-containing $RH_x$ compounds and/or the mono- and polyamino-containing $RH_x$ compounds.

The vicinal epoxides used in the process of the instant invention include ethylene oxide, 1,2-propylene oxide, isobutylene oxide, 1,2-butylene oxide, 2,3-butylene oxide, 1,2-pentylene oxide, styrene oxide, allyl glycidyl ether, ethyl glycidyl ether, butyl glycidyl ether, and the like. The suitable epoxides are represented by the formula:

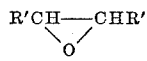

wherein R' represents hydrogen, aryl such as phenyl, nitrophenyl, chlorophenyl, methylphenyl, etc., alkyl of from 1 to about 4 carbon atoms, alkoxy having from 1 to about 4 carbon atoms, or alkenoxy having from 2 to about 4 carbon atoms.

In the reaction to produce the copolymer polyols, the vicinal epoxides form a divalent moiety of the formula:

in the molecule. This moiety is identified herein by the term "alkyleneoxy" and this term includes all such moieties regardless of the make-up of the R' substituent.

The polymerizable ethylenically unsaturated monomers that can be used are characterized by the presence therein of at least one polymerizable aliphatic ethylenic unsaturated group of the type $>C=C<$. These monomers are well known in the art and include the hydrocarbon monomers such as butadiene, isoprene, 1,4-pentadiene, 1,6-hexadiene, 1,7-octadiene, styrene, alpha-methylstyrene, methylstyrene, dimethylstyrene, ethylstyrene, isopropylstyrene, butylstyrene, phenylstyrene, cyclohexylstyrene, benzylstyrene, and the like; substituted styrenes such as chlorostyrene, bromostyrene, fluorostyrene, trifluoromethylstyrene, iodostyrene, cyanostyrene, nitrostyrene, N,N-dimethylaminostyrene, acetoxystyrene, methyl 4-vinylbenzoate, phenoxystyrene, norbornene, norbornadiene, p-vinyl diphenyl sulfide, p-vinylphenyl phenyl oxide, and the like; the acrylic and substituted acrylic monomers such as methyl acrylate, ethyl acrylate, allyl acrylate, methyl methacrylate, methacrylic anhydride, acrylic anhydride, cyclohexyl methacrylate, benzyl methacrylate, isopropyl methacrylate, octyl methacrylate, acrylonitrile, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, alpha-chloroacrylonitrile, N,N-dimethylacrylamide, N,N-dibenzylacrylamide, N-butylacrylamide, methacrylyl formamide, and the like; the vinyl esters, vinyl halides, vinyl ethers, vinyl ketones, etc. such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl chloride, vinyl bromide, vinyl fluoride, vinylidene chloride, vinylidene bromide, 1-chloro-1-fluoroethylene, vinylidene fluoride, vinyl methyl ether, vinyl ethyl ether, vinyl propyl ethers, vinyl butyl ethers, vinyl-2-ethyl hexyl ether, vinyl phenyl ether, vinyl-2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, vinyl isocyanate, allyl isocyanate, dimethyl maleate, and the like. Any of the known polymerizable monomers can be used and the above list is illustrative only, not exhaustive.

In the polymerization reaction, the ethylenically unsaturated monomers react via the double bond to produce chains. The individual moiety formed from each monomer molecule in the polymerization is a divalent moiety which is herein identified by the term "alkylenyl."

It is also understood that mixtures of the organic starters, vicinal epoxide, and/or polymerizable monomers can be used to produce the copolymer polyols.

The copolymer polyols are therefore compositions which can be represented as follows:

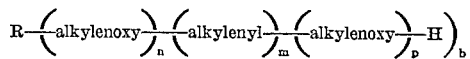

wherein R represents the residue of the organic starter with the reactive hydrogen atom thereof removed, alkylenoxy is the divalent residue of the vicinal epoxide, alkylenyl is the divalent residue of the polymerizable ethylenically unsaturated monomer and in some instances a higher-valent residue resulting from branching reactions that may occur, n, m, and p are whole integers, and b is an integer corresponding to the valence state of the residue R.

The polymerization reaction is carried out in the presence of an anionic catalyst or a mixture of anionic and free radical catalysts. In some instances cationic catalysts, such as boron trifluoride or phosphorus pentafluoride, can also be used but they steer the reaction to produce a different product, generally one which is not a copolymer polyol. Suitable anionic catalysts are the alkali metal hydroxides, sodium hydroxide, potassium hydroxide, lithium hydroxide; the metal carbonates such as sodium carbonate, calcium carbonate, and the like; the amides such as sodium amide, potassium amide, calcium amide, and the like; organic alkoxides such as sodium methoxide, potassium ethoxide, potassium t-butoxide, and similar alkoxides including those of the metals calcium, rubidium, magnesium, etc., and the like.

The useful free radical generating compounds are known to include the peroxides such as benzoyl peroxide, benzoyl hydroperoxide, acetyl peroxide, lauroyl peroxide, 2,4-dichlorobenzoyl peroxide, 4-chlorobenzoyl peroxide, decanoyl peroxide, succinic acid peroxide, cyclohexanone peroxide, bis(1-hydroxycyclohexyl)-peroxide, methyl ethyl ketone peroxide, hydroxyheptyl peroxide, t-butyl peracetate, t-butyl peroxyisobutyrate, t-butyl perbenzoate, dicumyl peroxide, cumene hydroperoxide, t-butyl hydroperoxide, di-t-butyl peroxide, 2,5-dimethyl-2,5-di(t-butyl peroxy)hexyne-3, p-menthane hydroperoxide, pinane hydroperoxide, di-t-butyl diperphthalate, 2,5-dimethyl-2,5-di(t-butyl peroxy)hexane, hydrogen peroxide, butyryl peroxide, peracetic acid, dichloroacetyl peroxide, acetyl dichloroacetyl peroxide, and the like; the azo catalysts such as azobisisobutyronitrile; the per compounds such as the persulfates, percarbonates, perborates, and the like, for example, sodium persulfate, potassium percarbonate, sodium perborate, t-butyl perbenzoate, isopropyl percarbonate, etc.

In the copolymerization reaction, the anionic catalysts and mixtures of anionic and free radical catalysts produce copolymer polyols containing both the divalent alkyleneoxy moiety from the vicinal epoxide and the divalent alkylenyl moiety from the polymerizable ethylenically unsaturated monomer in the molecule. Thus, for example, if one were to illustrate the process with glycerol as the organic starter, 1,2-propylene oxide and acrylonitrile the copolymer polyol would contain the following moieties:

1—the residue from the organic starter glycerol

CH₂O—
CHO—
CH₂O—

2—divalent alkyleneoxy residues from the 1,2-propylene oxide

—CH₂CHO—
       |
       CH₃

3—divalent alkylenyl residues from the acrylonitrile

—CH₂CH—
       |
       CN

The copolymer polyol could have the following structure, in the absence of branching

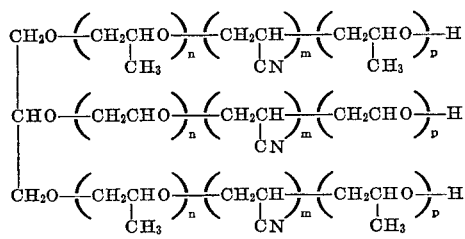

It has been noted, however, that in some instances an acidic hydrogen atom will generate an active site on the chain and branched copolymer polyols result; for example the hydrogen atom on the carbon atom alpha to the nitrilo group could in the presence of a strong base or alkoxide generate the corresponding carbanion which would then react with the vicinal epoxide to form a branched and highly functional product, as represented by the partial formula

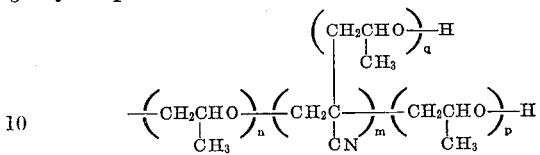

It is this tendency to form branches on the polymeric chain that enables one to produce a polyol from a monofunctional organic starter. For example with hexanol as the starter, the copolymer could be a linear monohydroxyl composition

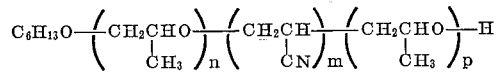

or the copolymer polyol could be branched and polyhydric

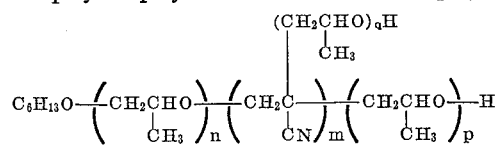

As is also evident, in some instances, some of the chains may terminate with a group from the ethylenic monomer rather than the group produced from the vicinal epoxide and in such cases the value of the integer p is zero.

The copolymer polyols produced with the anionic catalysts alone tend to have shorter chains of the ethylenically unsaturated monomer units than do the copolymer polyols produced with a mixture of anionic and free radical catalysts. This results from the fact that the anionic catalysts tend to produce relatively long sections of polyalkyleneoxy units and the free radical catalysts tend to produce relatively long sections of polymerized ethylenic monomer units. The copolymer polyols produced with some free radical catalyst present are generally more highly branched and of higher average molecular weight than are the copolymer polyols produced in the absence of any free radical catalyst.

Cationic catalysts when used with certain unsaturated monomers may not produce the copolymer polyol since they do not always cause copolymerization to take place between the epoxide and the ethylenically unsaturated monomer. In such instances, for example with acrylonitrile, whether the cationic catalyst is used alone or in conjunction with a free radical catalyst, the product is a mixture of a polyol formed from the organic starter and the vicinal epoxide together with a polymer produced from the ethylenically unsaturated monomer, with a minor amount of graft copolymer present. In other instances, for example with styrene or vinyl methyl ether, copolymerization will occur quite readily.

The amount of catalyst necessary can vary over a wide range, as is known in the art. The only requirement is that a catalytic amount sufficient to catalyze the reaction is present. Generally a total of from about 0.001 to about 10 weight percent is adequate, based on the total amount of vicinal epoxide and ethylenically unsaturated monomer charged; an amount of from about 1 to 5 weight percent is preferred. The relative amount of anionic catalyst to free radical catalyst is not critical when a mixture of catalysts is used, provided, however, that there is sufficient anionic catalyst to permit the reaction to proceed at a reasonable rate.

If desired, the polymerization reaction can be carried out in the presence of an inert organic solvent. The use of such solvents, however, is not a requisite since the reaction can generally be carried out in the absence of any solvent. Illustrative of solvents that can be used one can mention toluene, benzene, acetonitrile, heptane, acetone, dimethylformamide, dimethylacetamide, dimethyl sulfoxide, tetrahydrofurane, diethylene glycol dimethylether and the like.

The copolymer polyols can be produced at a temperature of from about 35° C. to about 250° C. or higher, and at atmospheric or superatmospheric pressures up to about 5000 p.s.i.g. or more. Pressure and temperature are not critical and will vary for each system depending upon the starting materials and catalysts. Generally satisfactory reaction rates are attained at temperatures from about 50° C. to about 125° C. and pressures of about 25 p.s.i.g. to about 500 p.s.i.g Under these conditions a wide variety of copolymer polyols are produced. Generally these are viscous liquids having a Brookfield viscosity at 25° C. of from about 500 centipoises or less to about 500,000 centipoises or more, and can even exceed 1,000,000 centipoises.

The copolymer polyols of this invention can be used to produce polyurethanes by the reaction thereof with isocyanates. The processes for producing polyurethanes is well known and the conventional processes can be used herein. In producing the polyurethanes, the copolymer polyols can be used as they are produced, or in admixture, or diluted with one or more of the known polyether polyols or polyester polyols. The technical literature and patent literature is replete with various such polyols and a detailed description is not necessary herein since one skilled in the art of polyurethanes knows these compounds well.

Flexible foams, semi-rigid foams, rigid foams and elastomeric polyurethanes can be produced with the copolymer polyols of this invention. These polyurethane products have established uses in the field of surface coatings, cushioning, insulation, etc. The polyurethanes can be produced by the one-shot, prepolymer or quasi-prepolymer processes, all of which are known in the art.

In producing foams, foaming can be accomplished by employing a small amount of water in the reaction mixture (for example, from about 0.5 to 5 weight percent of water, based on total weight of the reaction mixture), or through the use of equivalent blowing agents which are vaporized by the exotherm of the isocyanate-reactive hydrogen reaction, or by a combination of the two methods. All of these methods are known in the art. The preferred blowing agents are those halogen-substituted aliphatic hydrocarbons which have boiling points between about −40° C. and 70° C., and which vaporize at or below the temperature of the foaming mass. The blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro1,2,2,-trifluoroethane, 1,1,1 - trichloro - 2,2,2 - trifluoroethane, 2 - chloro-1,1,1,2,3,3,4,4,4-nonafluorobutane, hexafluorocyclobutene, and octafluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed as is known in the art, including acetone, and the like. A further class of blowing agents includes the thermally unstable compounds which liberate gases upon heating, such as N,N' - dimethyl - N,N' - dinitrosoterephthalamide, ammonium bicarbonate, and the like.

The amount of blowing agent used will vary with the density desired in the foamed product. In general it may be stated that for 100 grams of reaction mixture containing an average isocyanate to reactive hydrogen ratio of about 1:1, about 0.005 to 0.3 mole of gas are used to provide densities ranging from 30 to 1 pounds per cubic foot respectively.

Catalysts can be employed in the reaction mixture for accelerating the isocyanate-reactive hydrogen reaction. Such catalysts include a wide variety of compounds and illustrative thereof one can mention, for example:

(a) Tertiary amines such as trimethylamine, triethylamine, N-methylmorpholine, N-ethylmorpholine, N,N-dimethylbenzylamine, N,N-dimethylethanolamine, N,N,N',N' - tetramethyl-1,3-butanediamine, triethanolamine, 1,4-diazabicyclo[2.2.1]octane, pyridine N-oxide, triethylamine N-oxide, and the like;

(b) Tertiary phosphines such as trialkylphosphines, dialkylbenzylphosphines, and the like;

(c) Strong bases such as the alkali and alkaline earth metal hydroxides, alkoxides, and phenoxides;

(d) Acidic metal salts of strong acids such as ferric chloride, stannic chloride, stannous chloride, antimony trichloride, bismuth nitrate, bismuth chloride, and the like;

(e) Chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

(f) Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones and 2-(N,N-dialkylamino)alkanols, such as the well known chelates of titanium obtained by said or equivalent procedures;

(g) Salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) Organometallic derivatives of tetravalent tin, trivalent and pentavalent As, Sb, and Bi, and metal carbonyls of iron and cobalt. As is obvious to those skilled in the art, many other catalysts and solvents that have a catalytic effect can also be used.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-methylaminopentylate), dibutyltin dichloride, dioctyltin dichloride, and the like.

The tertiary amines may be used as primary catalysts for accelerating the reactive hydrogen/isocyanato reaction or as secondary catalysts in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

It is also within the scope of the invention to employ small amounts, e.g., about 0.001% to 5.0% by weight, based on the total reaction mixture, of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480.

Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Although the use of an emulsifier is desirable to influence the type of foam structure that is formed, the foam products of the invention can be prepared without emulsifiers.

Among the organic polyisocyanates and polythioisocyanates which can be employed to produce the polyurethane products of the invention are found, for example, ethylene diisocyanate, trimethylene diisocyanate, tetramethylene diisocyanate, pentamethylene diisocyanate, hexamethylene diisocyanate, propylene-1,2-diisocyanate, butylene-1,2-diisocyanate, butylene-1,3-diisocyanate, butylene-2,3-diisocyanate, and the corresponding diisothiocyanates such as butylene-1,3-diisothiocyanate; alkylidene diisocyanates and diisothiocyanates, such as ethylidene diisocyanate, butylidene diisocyanate and ethylidine diisothiocyanate; cycloalkylene diisocyanates and diisothiocyanates, such as cyclopentylene-1,3-diisocyanate, cyclohexylene-1,2-diisocyanate, cyclohexylene-1,3-diisocyanate, cyclohexylene-1,4-diisocyanate, and cyclohexylene-1,2-diisothiocyanate; cycloalkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as m-phenylene diisocyanate, p-phenylene diisocyanate, polymethylene polyphenylisocyanate, 2,4-tolylene diisocyanate, 2,6-tolylene diisocyanate, dianisidine diisocyanate, bitolylene diisocyanate, naphthalene-1,4-diisocyanate, diphenylene-4,4'-diisocyanate or p-phenylene diisothiocyanate; aliphatic-aromatic diisocyanates or diisothiocyanates, such as xylylene-1,4-diisocyanate, xylylene-1,3-diisocyanate, bis(4-isocyanatophenyl)methane, bis(3-methyl-4-isocyanatophenyl)methane, 4,4'-diphenylpropane diisocyanate or xylylene-1,4-diisothiocyanate; the polyisocyanates disclosed in U.S. Patent No. 2,683,730, as well as the polyisocyanates listed in the publication of Sieflken, Annalen, 562, pages 122–135 (1949). Also included are durylene diisocyanate, 4,4',4''-tris(isocyanatophenyl)methane, 3,10-diisocyanatotricyclo[5.2.1.0$^{2,6}$]decane, bis-(2-isocyanatoethyl)carbonate, and the like. The term "polyisocyanate" is used in this entire specification to encompass the polythioisocyanates.

The following examples further serve to illustrate the invention but are not to be construed as restricting it in any manner whatsoever. Parts are by weight unless otherwise specified.

Example 1

A reaction vessel is charged with 532 parts of tris(2-hydroxypropoxy)propane and 30 parts of potassium hydroxide. A mixture of 550 parts of acrylonitrile and 4,950 parts of 1,2-propylene oxide is added over a five hour period while the temperature of the reaction is maintained at 110° C. and the pressure in the reactor is kept at 50 p.s.i.g. Heating and stirring are continued for 5 hours. There is recovered 6,580 parts of crude copolymer polyol as a viscous brown-orange composition. The crude product is neutralized and refined by adding about 300 parts of magnesium silicate. The mixture is stirred at 90° C. under nitrogen for one hour, 3 parts of 2,6-di-t-butyl-4-methylphenol stabilizer is added, and then filtered. The filtrate is vacuum stripped for five hours at 90° C. to 100° C. and 5 to 10 mm. mercury to remove volatile materials. The refined copolymer polyol is brown and has an average hydroxyl number of 116.1, a Brookfield viscosity of 1280 centipoises at 25° C., an average molecular weight (Menzies-Wright in benzene) of 1200 and a nitrogen content of 3.1 weight percent. The nitrogen analysis indicates a polymerized acrylonitrile content of 11.7 weight percent.

In a similar manner copolymer polyols are produced with the starting materials listed in the following table:

| Catalyst | Organic Starter | Vicinal Epoxide | Polymerizable Monomer |
| --- | --- | --- | --- |
| Sodium hydroxide | Methanol | Ethylene oxide/styrene oxide | Vinyl acetate/acrylamide. |
| Potassium hydroxide | 2-ethylhexanol | 1,2-propylene oxide | Vinyl chloride/styrene. |
| Potassium hydroxide/benzoyl peroxide | Ethylene glycol | do | Methacrylonitrile. |
| Sodium amide/dicumyl peroxide | 1,3-butanediol | 1,2-butylene oxide | Acrylonitrile/styrene. |
| Lithium hydroxide | 2-methyl-1,5-pentanediol | 1,2-propylene oxide | Vinyl methyl ether/isoprene. |
| Potassium methoxide | Sucrose | 1,2-propylene oxide/ethylene oxide | Acrylonitrile. |
| Potassium hydroxide | Sorbitol | 1,2-propylene oxide | Do. |
| Potassium hydroxide/t-butyl hydroperoxide | Ethylenediamine | 1,2-propylene oxide/ethylene oxide | Vinylidene cyanide/butadiene. |
| Sodium hydroxide/azobisisobutytronitrile | Tetraethylene glycol | Ethylene oxide/butylene oxide | Alpha-methylstryene. |
| Potassium hydroxide | Polypropylene glycol 425 | Ethylene oxide | Styrene. |
| Do | Citric acid | 1,2-propylene oxide | 2-hydroxypropyl acrylate/acrylamide. |
| Do | Glycerol | Allyl glycidyl ether | Acrylonitrile. |
| Do | do | Butyl glycidyl ether | Do. |

Example 2

A mixture of 3,938 parts of 1,2-propylene oxide and 982 parts of acrylonitrile is added over a nine hour period at 110° C. and 45 p.s.i.g. to a composition of 532 parts of tris(2-hydroxypropoxy)propane and 30 parts of potassium hydroxide. After the addition is completed the reaction is stirred at 110° C. for another 4 hours. The yield of crude copolymer polyol is 5,384 parts. The crude product is purified as described in Example 1 and the brown refined copolymer polyol has an average hydroxyl number of 200, and a Brookfield viscosity of 11,200 centipoises at 25° C.

In a similar manner a copolymer polyol is produced using a mixture of 1,2-propylene oxide, styrene oxide, and acrylonitrile.

Example 3

A mixture of 281.5 parts of tris(2-hydroxypropoxy) propane, 5.62 parts of potassium hydroxide and 560 parts of dimethyl sulfoxide is prepared in a reactor. To this mixture there are simultaneously added two feed streams over a twelve hour period; the one stream is 912 parts of acrylonitrile and the other stream is 2,815 parts of 1,2-propylene oxide containing 40 parts of azobisisobutyronitrile. The temperature is maintained at about 73° C. during the addition, and stirring is continued thereat for an additional 2 hours. Then a mixture of 300 parts of 1,2-propylene oxide and 10 parts of azobisisobutyronitrile is added and stirring continued for another 12.25 hours at 76° C. Thereafter the reaction mixture is vacuum stripped at a pressure of 5 mm. of mercury and 100° C. to 110° C. for 2 hours to remove 1,160 parts of volatiles. There is obtained 3,085 parts of the desired copolymer polyol. The copolymer polyol is brown-orange in color, it has a Brookfield viscosity of 464,000 centipoises at 25° C. and a hydroxyl number of 119.

In a similar manner copolymer polyols are produced with the starting materials listed below.

The formulation was stirred and poured into an open mold as soon as it started to foam. The foam set rapidly and could be removed from the mold within a short time. This formulation produced a rigid foam.

Flexible and semi-rigid foams were produced by blend-

| Catalyst | Organic Starter | Vicinal Epoxide | Polymerizable Monomer |
|---|---|---|---|
| Potassium hydroxide | 1,2,6-hexanetriol | 1,2-propylene oxide | Acrylamide/styrene. |
| Do | Glycerol | 1,2-propylene oxide/styrene oxide | Isoprene/acrylonitrile. |
| Sodium hydroxide/di-t-butyl peroxide | 1,2,6-hexanetriol | 1,2-propylene oxide | Acrylonitrile. |
| Potassium hydroxide | Trimethylolpropane | do | Methacrylonitrile. |
| Do | Tetramethylolmethane | do | Acrylonitrile/butadiene. |
| Potassium hydroxide/ABN [1] | Tris(2-hydroxypropoxy)-propane | 1,2-propylene oxide/ethylene oxide | Acrylonitrile. |
| Do | do | 1,2-propylene oxide | Vinylidene cyanide. |
| Do | do | 1,2-propylene oxide/styrene oxide | Acrylonitrile. |
| Do | do | 1,2-propylene oxide/2,3-butylene oxide | Do. |
| Do | do | 1,2-propylene oxide | Vinyl chloride/acrylamide. |
| Do | do | do | Acrylonitrile/styrene. |

[1] Azobisisobutyronitrile.

Example 4

A mixture of 210 parts of tris(2-hydroxypropoxy) propane, 4.2 parts of potassium hydroxide and 420 parts of dimethyl sulfoxide is prepared in a reactor. To this mixture there are simultaneously added two feed streams over a 12.25 hour period; one stream is 685 parts of acrylonitrile and the other stream is a mixture of 2,105 parts of 1,2-propylene oxide and 30 parts of azobisisobutyronitrile. The temperature is maintained at about 72° C. during the addition, and stirring is continued thereat for an additional 2 hours. The reaction product is vacuum stripped at a pressure of 5 mm. of mercury and a temperature of 100° C. to 110° C. for two hours to remove 1,160 parts of volatiles. There is obtained 2,210 parts of the desired copolymer polyol, which is brown-orange and has a Brookfield viscosity of 360,000 centipoises at 25° C. and a hydroxyl number of 112.

ing the copolymer polyol of Example 2 with varying amounts of a conventional polyol (Polyol A) made by the addition of 1,2-propylene oxide to glycerol to an average molecular weight of about 3,000 and an average hydroxyl number of 56. The formulations used were similar except where indicated. For comparison a foam was produced with unmodified Polyol A. The results are set forth below.

| Run | I | II | III [1] | IV | V [2] | VI | VII [3] |
|---|---|---|---|---|---|---|---|
| Polyol A, wt. percent | 75 | 25 | 25 | 25 | 25 | 100 | |
| Copolymer polyol of Ex. 2, wt. percent | 25 | 75 | 75 | 75 | 75 | | 100 |
| Foam type | F | SR | SR | SR | SR | F | R |
| Foam properties: | | | | | | | |
| Tensile, p.s.i. | 8.2 | 35.0 | 10.5 | 19.9 | 19.3 | 10.8 | |
| Elongation, percent | 38 | 27.5 | 19 | 28 | 35 | 95 | |
| Density, lb./cu. ft. | 2.1 | 1.64 | 1.94 | 1.86 | 1.52 | 1.8 | |
| Indentation load deflection, p.s.i.: | | | | | | | |
| 25% | 0.67 | 1.9 | 1.6 | 1.5 | 1.9 | 0.78 | |
| 65% | 1.9 | 7.1 | 8.8 | 7.4 | 8.8 | 1.5 | |
| 90% | 14.0 | 36.7 | 55.2 | 30.0 | 28.5 | 8.3 | |
| Resiliency, percent | 19.5 | 30.0 | 22.0 | 32.5 | 39.0 | 38.5 | |

[1] The siloxane emulsifier was omitted from the formulation.
[2] 10 parts of fluorotrichloromethane added.
[3] The foam was not tested; it had good cell size and appearance.
F=Flexible; SR=Semi-rigid; R=Rigid.

Example 5

A formulation was prepared of:

| | Parts |
|---|---|
| Copolymer polyol of Example 2 | 100 |
| Tetramethylbutanediamine | 0.1 |
| Siloxane emulsifier [1] | 2.0 |
| Water | 3.5 |
| Stannous octoate | 0.35 |
| Tolylene diisocyanate [2] | |

[1] A polysiloxane polyoxyalkylene block copolymer of the formula

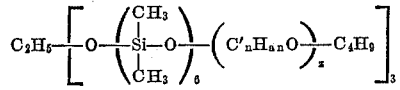

wherein $(C_nH_{2n}O)_x$ represents an average of 12 ethyleneoxy units and propylenoxy groups.

[2] A mixture of 80 percent 2,4-isomer and 20 percent 2,6-isomer; a stoichiometric excess of 5 weight percent was used.

Example 6

A formulation was prepared of:

| | Parts |
|---|---|
| Copolymer polyol of Example 3 | 25 |
| Polyol A | 75 |
| Siloxane emulsifier | 2 |
| Water | 3.5 |
| Stannous octoate | 0.3 |
| Tolylene diisocyanates | 47.2 |

The formulation was foamed as described in Example 5.

Example 7

A formulation was prepared of:

| | Parts |
|---|---|
| Copolymer polyol of Example 4 | 25 |
| Polyol A | 75 |
| Siloxane emulsifier | 2 |
| Water | 3.5 |
| Stannous octoate | 0.3 |
| Tolylene diisocyanates | 46.9 |

The formulation was foamed as described in Example 5.

The properties of the flexible polyurethane foams of Examples 6 and 7 are tabulated below. Also included are the properties of the flexible foam produced from 100 parts of Polyol A alone.

| Example | 6 | 7 | Control |
|---|---|---|---|
| Tensile, p.s.i. | 7.30 | 7.66 | 14.14 |
| Elongation, percent | 85 | 103 | 145 |
| Density, lb./cu. ft. | 1.50 | 1.49 | 1.63 |
| Indentation load deflection, p.s.i.: | | | |
| 25% | 0.64 | 0.59 | 0.70 |
| 65% | 1.35 | 1.24 | 1.38 |
| 90% | 5.50 | 5.27 | 5.40 |
| Resiliency, percent | 23.0 | 15.0 | 47.0 |

An experiment was performed using a catalyst combination of a cationic catalyst and a free radical catalyst to produce the polymer polyol composition. In this experiment 46 parts of glycerol, 10 ml. of boron trifluoride etherate and 1,000 parts of ethylene glycol dimethyl ether were placed in a flask and to this were added two separate streams over an 80 minute period at a reaction temperature of 55° C. to 85° C. One stream consisted of 390 parts of acrylonitrile and the other stream was a mixture of 1,500 parts of 1,2-propylene oxide containing 10 parts of azobisisobutyronitrile. During the addition another 8 ml. of boron trifluoride etherate was added in a dropwise fashion. After standing overnight at room temperature the reaction was vacuum stripped at 100° C. and 2 mm. mercury pressure and about 2200 parts of distillate was obtained. The viscous residual composition was neutralized with 20 ml. of concentrated ammonium hydroxide and vacuum stripped for another three hours to remove another 26 parts of distillate. The polymer polyol composition produced was light yellow and it had a Brookfield viscosity of 2400 centipoises at 25° C. and a hydroxyl number of 180. A polyurethane foam produced using a 50/50 mixture of this composition and Polyol A was semi-flexible, and it had a density of 2.12 lb./cu. ft. and a resiliency of 13 percent.

The properties of the foams were determined using test procedures set forth below. Tensile and elongation were measured according to ASTM D–1564, suffix T, except that a gauge length of one inch was specified. Density was measured according to ASTM D–1564, suffix W. Indentation load deflection properties were measured by method ASTM D–1564 using a 4″ x 4″ x 1″ sample and an indentor having a diameter of 2.25 inches. Resiliency was measured by the ball rebound test in ASTM D–1564–59 through 64.

What is claimed is:

1. A process for producing a copolymer polyol comprising catalytically polymerizing an organic starter having at least one reactive hydrogen with a mixture of a vicinal epoxide of the formula

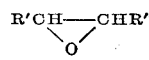

wherein R' is a member selected from the group consisting of hydrogen, aryl containing six ring carbon atoms, alkyl of from 1 to about 4 carbon atoms, alkoxy of from 1 to about 4 carbon atoms, and alkenoxy of from 2 to about 4 carbon atoms, and a polymerizable ethylenically unsaturated monomer in contact with a catalytic amount of a catalyst selected from the group consisting of anionic catalyst, cationic catalyst and free radical catalyst.

2. The process of claim 1 wherein the polymerization is carried out in contact with an anionic catalyst.

3. The process of claim 1 wherein the polymerization is carried out in contact with a mixture of an anionic catalyst and a free radical catalyst.

4. The process of claim 1 wherein the polymerization is carried out in contact with a mixture of a cationic catalyst and a free radical catalyst.

5. The process of claim 1, wherein the organic starter is a member selected from the group consisting of hydroxyl-containing compounds, carboxyl-containing organic starter compounds, and amino-containing organic starter compounds.

6. The process of claim 1, wherein the vicinal epoxide has the formula

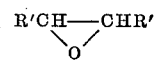

wherein R' is a member selected from the group consisting of hydrogen, aryl containing six ring carbon atoms, alkyl of from 1 to about 4 carbon atoms, alkoxy of from 1 to about 4 carbon atoms, and alkenoxy of from 2 to about 4 carbon atoms.

7. The process of claim 1, wherein a free radical catalyst is also present in the reaction mixture.

8. The process of claim 1, wherein the organic starter is tris(2-hydroxypropoxy)propane.

9. The process of claim 1, wherein the vicinal epoxide is 1,2-propylene oxide.

10. The process of claim 1, wherein the monomer is acrylonitrile.

11. The process of claim 4, wherein the organic starter is tris(2-hydroxypropoxy)propane, the vicinal epoxide is 1,2-propylene oxide, and the monomer is acrylonitrile.

12. A random copolymer polyol of the formula

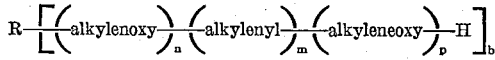

wherein R is the residue of an organic starter, alkyleneoxy is the divalent residue of a vicinal epoxide of the formula

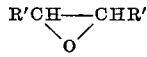

wherein R' is a member selected from the group consisting of hydrogen aryl containing six ring carbon atoms, alkyl of from 1 to about 4 carbon atoms, alkoxy of from 1 to about 4 carbon atoms, and alkenoxy of from 2 to about 4 carbon atoms, alkylenyl is the polyvalent residue of a polymerizable ethylenically unsaturated monomer, n, m, and p are whole integers, and b is the valence state of the residue R.

13. The random copolymer polyol of the formula

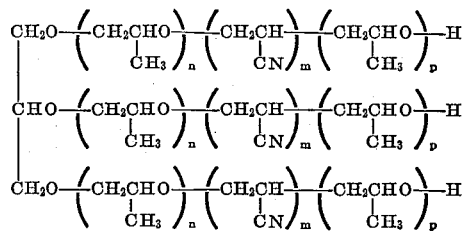

where n, m, and p are whole integers.

14. The random copolymer polyols of claim 12 wherein the Brookfield viscosity at 25° C. is at least 500 centipoises and the vicinal epoxide is 1,2-propylene oxide.

References Cited

UNITED STATES PATENTS

| 2,382,285 | 8/1945 | Bergel et al. | 260—465 |
| 3,044,989 | 7/1962 | Shivers | 260—584 XR |
| 3,119,848 | 1/1964 | Wrigley et al. | 260—465.6 XR |
| 3,255,253 | 6/1966 | Kuryla | 260—584 |

FOREIGN PATENTS

| 1,194,712 | 11/1959 | France. |
| 1,157,387 | 11/1963 | Germany. |
| 1,167,521 | 4/1964 | Germany. |

FLOYD D. HIGEL, *Primary Examiner.*